United States Patent [19]

Bowser

[11] Patent Number: 5,116,650
[45] Date of Patent: May 26, 1992

[54] DIOXOLE/TFE COPOLYMER COMPOSITES

[75] Inventor: John Bowser, Newark, Del.

[73] Assignee: W. L. Gore & Associates, Inc., Newark, Del.

[21] Appl. No.: 621,661

[22] Filed: Dec. 3, 1990

[51] Int. Cl.$^5$ .................. B01D 71/36; B32B 5/28; B32B 27/04; B32B 33/00
[52] U.S. Cl. ................... 428/34.2; 55/524; 55/527; 55/528; 162/168.1; 428/34.5; 428/34.7; 428/36.1; 428/36.5; 428/36.9; 428/255; 428/265; 428/267; 428/272; 428/288; 428/290; 428/308.4; 428/308.8; 428/315.7; 428/319.7; 428/422

[58] Field of Search .......... 55/524, 527, 528; 428/34.2, 34.5, 34.7, 36.1, 36.5, 36.9, 255, 265, 267, 272, 288, 290, 308.4, 308.8, 315.7, 319.7, 422; 162/168.1

[56] References Cited

U.S. PATENT DOCUMENTS 4,754,009  6/1988  Squire .................. 526/247

Primary Examiner—James C. Cannon
Attorney, Agent, or Firm—Gary A. Samuels

[57] ABSTRACT

A gas permeable material comprising a material having continuous pores through it, in which the pore interiors are coated with an amorphous copolymer of tetrafluoroethylene and perfluoro-2,2-dimethyl-1,3-dioxole.

5 Claims, No Drawings

DIOXOLE/TFE COPOLYMER COMPOSITES

FIELD OF THE INVENTION

This invention relates to gas permeable materials that are hydrophobic and oleophobic. More particularly, the invention relates to gas filters and vents in which the filter or vent is coated with a fluoropolymer, and results in the material having hydrophobic and oleophobic properties.

BACKGROUND OF THE INVENTION

There is a need for gas permeable materials having enhanced oleophobic and hydrophobic properties. Tetrafluoroethylene polymers are known to have hydrophobic properties and they are useful as hydrophobic films or as hydrophobic coatings on substrates. However, some tetrafluoroethylene polymers, such as polytetrafluoroethylene, are difficult to apply to substrates because they are not thermoplastic, and are not easily soluble. They cannot be applied by common thermoplastic extrusion techniques.

Gas air filters and vents have been made from porous material including porous polymers, such as porous polyolefins or polytetrafluoroethylene. However, even with porous polytetrafluoroethylene, the material has poor oleophobicity. This lack of resistance to oil penetration has impaired use of such materials as gaseous vents or filters in uses involving engines or devices that are commonly exposed to oil in the surrounding environment.

SUMMARY OF THE INVENTION

In this invention, a gas permeable material is provided which has passageways, or continuous pores, through the material. The material is coated with an amorphous copolymer of 10–40 mole percent tetrafluoroethylene and complementally 90–60 mole percent of perfluoro-2,2-dimethyl-1,3-dioxole. The coating coats at least a portion of the interior of the pores but does not fully block the pores. Thus, the gas permeability property of the gas permeable material remains intact and the material is useful as a gas filter. The presence of the amorphous copolymer coating renders the material more oleophobic that the material without the coating.

DESCRIPTION OF THE INVENTION

The gas permeable material can be any material that allows passage of gas, especially air. It is a material that contains interstices that comprise continuous passages extending through the thickness of the material. The passageways open on both sides of the sheet. Preferably the material is in sheet, tube, or plug form.

The gas permeable material can be a fabric, such as a nonwoven, woven, or knit fabric, or a scrim, so long as it has interstices or passageways or pores that permit flow of gas or air. The material can be made of paper such as filter paper, or cloth, synthetic or natural. The material can also be a porous polymeric film or membrane where the pores form the interstices or passageways. By "porous" is meant that the film or membrane has continuous pores through its thickness from one side to the other. As synthetics or polymers, the fabric or film can be polyamide, polyester, polyvinylidene fluoride, polyacrylic, polyolefins such as polyethylene and polypropylene, and the like.

Preferred as a gas permeable material is porous polytetrafluoroethylene (PTFE), especially microporous expanded polytetrafluoroethylene membrane sheet made as described in U.S. Pat. No. 3,953,566 which has a microstructure of nodes interconnected with fibrils. The resulting micropores or voids allow for good gas or air flow while providing liquid water resistance. These porous PTFE membranes preferably have a Gurley number of 600 or less.

The amorphous copolymer coating contains about 60–90 mole percent perfluoro-2,2-dimethyl-1,3-dioxole and complementally 40–10 mole percent tetrafluoroethylene. Thus it may also contain minor amounts of other comonomer units. The copolymer is available from the DuPont Company as Teflon® AF 1600 in which the mole percent of the dioxole units present is about 65%, and as Teflon AF 2400 in which the mole percent dioxole units present are about 85 mole percent.

The amorphous dioxole copolymer is conveniently applied from solution in which the solvent is perfluoro-(2-butyltetrahydrofuran). The solution should be dilute because the ultimate coating should not cover and seal the passageways, in order to preserve the gas permeable nature of the material. The solution preferably contains 0.01 to 5.0 percent wt./wt. dissolved solids.

The coating solution is applied by any convenient means to the material and spread uniformly over the surface of the material. Dip coating can be used so as to impregnate the pores. The solvent is then evaporated by any convenient means.

The materials used to form the gas permeable materials may contain various other additive ingredients to impart specific properties to the product or as a process aid. For example, the polymeric material may include ultraviolet light stabilizers, bacteriostats, insect repellants, anti-static agents, coloring dyes, plasticizers, and the like. The polymeric materials may also include residues left from processing; however, these are usually in such small amounts they do not significantly adversely effect the final product.

The resulting coated materials exhibit unusually good hydrophobic and oleophobic properties while having good gas or air flow through the material. The resulting coated material can be used in applications involving gas flow where the material should be resistant to penetration by water, oil, or lipid emulsions. Such applications include gas vents or filters that protect electronic equipment used in or near automotive engines and the like. It also includes venting of medical devices, and in industrial filtration when oil mists are present.

The coated materials are also useful in medical vents where oil or fatty substances in parental drip bottles can clog gas vents.

Porous PTFE alone, normally has little oleophobicity, yet with the coating of the amorphous dioxole copolymer described herein, the coated material is rendered oleophobic.

TEST PROCEDURES

Gurley Number

The resistance of samples to air flow was measured by a Gurley densometer (ASTM D726-58) manufactured by W. & L. E. Gurley & Sons. The results are reported in terms of Gurley number which is the time in seconds for 100 cubic centimeters of air to pass through 1 square inch of a test sample at a pressure drop of 4.88 inches of water.

Contact Angle

This test measures the angle-of-contact of a liquid upon a solid substrate. The apparatus used to perform this test was a Rame-Hart Crosshair Goniometer model A100 available from Rame-Hart Mountain Lakes, N.J. Apparatus includes a telemicroscope goniometer, 2.0 ml micrometer syringe, syringe holder, lamp with green filter, lamp aperture and lens, and vertical elevation stage. Test fluids used were distilled water and extra heavy mineral oil. The test is performed at ambient conditions. Sample to have contact angle measured was cut to a size that fit the stage and then held down to prevent movement. The tip of the syringe was held about 1 mm above the sample. The lamp was focused to illuminate the syringe tip. Using the syringe, test fluid was thereby applied to the sample surface until the diameter of the drop of fluid was about 3-4 mm. The drop on the sample was brought to focus within the telemicroscope goniometer. One crosshair was adjusted such that it coincided with the image of the base of the drop. The other crosshair was aligned tangent to the curvature of the drop intersecting the point of contact along the baseline. The angle between the crosshairs is read off the goniometer as the angle-of-contact.

Visual Oil Wetting

Samples to be checked for visual wetting are laid horizontally on a flat surface. The test fluids used to determine if wetting occurs are then placed on the surface of the test samples. A 7.5 ml transfer pipet is used to apply the test fluids to small areas on the surface of the samples. Approximately 2 to 3 ml of each test fluid is applied per sample. Each is observed initially for instant wetting. Samples are then rechecked after the prescribed time period, usually 30 to 60 minutes. This time period is based upon the volatility of the test fluids at ambient conditions so that they do not fully evaporate before wetting the sample. Wetting is indicated in samples after blotting off solution with an absorbent cloth. Fully wet-out areas become translucent to transparent. This indicates that the test fluid has entered sample pores. The samples that retain their original opacity indicate non-filled pores and therefore are not wet-out.

Bubble Point

The Bubble Point of porous PTFE was measured using Isopropyl Alcohol following ASTM F316-86. The Bubble Point is the pressure of air required to blow the first continuous bubbles detectable by their rise through a layer of Isopropyl Alcohol covering the PTFE media. This measurement provides an estimation of maximum pore size.

Water Entry Pressure Test Procedure

The Water Entry Pressure (WEP) was measured following the Quality Control Test Method No. 584 of W. L. Gore & Associates. The WEP tester used is manufactured by W. L. Gore. Test sample is clamped between a pair of testing plates taking care not to cause damage. The lower plate has the ability to pressurize a section of the sample with water. A piece of pH paper is placed on top of the sample between the plate on the nonpressurized side as an indicator of evidence for water entry. The sample is then pressurized in small increments, waiting 10 seconds after each pressure change until a color change in the pH paper indicates the first signs of water entry. The water pressure at breakthrough or entry is recorded as the Water Entry Pressure. The test results are taken from the center of test sample to avoid erroneous results that may occur from damaged edges.

Water entry pressure below 2 psi was measured with an apparatus based upon the above WEP tester with modifications for low pressure. A sample with pH paper is held in a 25 mm clear filter holder obtained from Nuclepore Corporation, such that one side of the membrane can be pressurized with water. Water column is applied to the sample in gradual increments until a color change appears in the pH paper. The height of the water column is recorded and converted to psi.

Synthetic Perspiration Test—Weighted Plate Method

The purpose of this test is to simulate the effect of human perspiration on the waterproofness of materials. The test was performed following Quality Control Test Method 511 at W. L. Gore & Associates, Inc. 2 ml of synthetic perspiration are placed on both sides of the test samples which are then compressed between two glass plates by a 4 pound weight for 16 hours. Samples are then rinsed and dried before they are checked for leakage using QCTM 501 Leakage Under Low Hydrostatic Pressure. Water pressure is applied to the sample at low pressure. If water breakthrough occurs, this is judged as a leak and, therefore, the material does not maintain its waterproofness after exposure to synthetic perspiration. Otherwise, water breakthrough does not occur, sample does not leak, indicating waterproofness has been maintained.

Synthetic Perspiration Test—Evaporative Method

The purpose of this test is to simulate the effect of human perspiration on the waterproofness of materials. The test was performed following Quality Control Test Method 510 at W. L. Gore & Associates, Inc. A specific volume of synthetic perspiration is evaporated through the test sample mounted in a fixture. Samples are then rinsed and dried before they are checked for leakage using QCTM 501 Leakage Under Low Hydrostatic Pressure. Water pressure is applied to the sample at low pressure. If water breakthrough occurs, this is judged as a leak and, therefore, the material does not maintain its waterproofness after exposure to synthetic perspiration. Otherwise, water breakthrough does not occur, sample does not leak, indicating waterproofness has been maintained.

EXAMPLES

Example 1

Coating Applied to Porous Membrane

Part A

A coating solution was obtained by placing 0.9845 gm. of a copolymer of tetrafluoroethylene (TFE and perfluoro-2,2-dimethyl-1,3-dioxole (PDD), Teflon® AF 1600 amorphous fluoropolymer (65 mole % PDD,) in 200 gm. perfluoro (2-butyltetrahydrofuran), called Fluoroinert-75, or FC-75, to result in a 0.49% wt. solution. The mixture was immersed in an ultrasonic bath to facilitate solubilization of the Teflon AF.

A porous polytetrafluoroethylene membrane (obtained from W. L. Gore and Associates) was stretched over and secured to an embroidery hoop so that tension was uniformly applied across the membrane. Holding the membrane taut prevents shrinkage due to solvent contact and subsequent volatilization of solvent. The membrane in the hoop was then held at a 45° angle over a catch pan. Using a 7.5 ml. transfer pipet, the solution of Teflon AF was applied generously to the membrane and spread with a glass rod until the entire membrane had become wetted-out (that is the pores had become filled with solution as evidenced by the normally opaque PTFE membrane becoming transparent). Excess solution dripped off into the pan. The coated membrane in the hoop was then suspended vertically within a fume hood for 20 minutes to dry the coated membrane. The coated membrane was then removed from the hoop.

One such coated membrane, Sample A, had a bubble point of about 15-20 psi and was affixed within a 7-inch embroidery hoop.

Another coated membrane, Sample B, had a bubble point of over 50 psi and was affixed within a 10-inch embroidery hoop.

Part B

A coating solution of 0.493% wt./wt. was prepared by dissolving 0.9916 gm. Teflon AF 1600 in 199.98 gm FC-75. The mixture was stirred with a magnetic stirrer to dissolve the Teflon AF. The solution was applied to a porous PTFE as used in Sample A in the same manner as recited in Part A. A 7-inch embroidery hoop was used. The coated membrane is referred to as Sample C.

The samples were tested and compared with untreated, i.e. uncoated, membrane with the following results:

|  | Treated Sample | Untreated Sample (Control) |
| --- | --- | --- |
| Sample A | .490% wt/wt solution | |
| Gurley Number (seconds) | 16.5 ± .4 | 15.8 ± 1.8 |
| Contact Angle (°) | | |
| H$_2$O (distilled) | 154.1, 152.8* | 128.1 |
| Oil (mineral oil) | 121.7, 118.8* | 72.2 ± 2.0 |
| Sample B | .490% wt/wt solution | |
| Gurley Number (seconds) | 363 ± 10 | 342 ± 3 |
| Contact Angle (°) | | |
| H$_2$O (distilled) | 120.1, 126.2* | 154.2 |
| Oil (mineral oil) | 97.3, 71.1* | 52.2 ± 3.5 |
| Sample C | .493% wt/wt solution | |
| Visual Oil Wetting | | |
| Motor Oil (10w/30) | No wet-out after 45 min. | Wet-out after 30 min. or less |
| Transmission Oil (Dexron II) | No wet-out after 45 min. | Wet-out after 30 min. or less |

*One measurement each face

As depicted by the Contact Angle measurements for Samples A and B, the Teflon AF coating has rendered them oleophobic. This is further evidenced by Sample C and its ability resist motor oil and transmission oil wet-out even after 45 minutes while untreated controls are wet-out in only 30 minutes or less. However, as described by the Gurley Number measurements, Samples A and B have no significant change in their ability to resist air flow indicating a light coating of Teflon AF has been applied.

Example 2

Coating Applied to Polyester Filter Screen

A solution of Teflon AF 1600 was prepared as described in Part A of Example 1.

A portion of a rigid polyester square weave filter screen, mesh count 47.2 per cm, thickness 0.0144 cm, weight 0.00664 g/cm$^2$, (Tetko ® filter screen available from Tetko, Inc.) was placed in a 150 mm diameter petri dish. The solution prepared above was generously applied to the screen using a 7.5 ml transfer pipet until the entire filter screen was covered with a thin layer of solution. The filter screen was turned over with tweezers to ensure that the interstitial void spaces of the screen were filled with solution.

The screen was then suspended vertically in a fume hood for 20 minutes to evaporate solvent. The dried treated screen (Sample D) and an untreated screen from the same source were tested and compared as follows:

Results:

|  | Treated Screen | Untreated Sample Screen (Control) |
| --- | --- | --- |
| Sample D | .490% wt/wt solution | |
| Contact Angle (°) | | |
| H$_2$O (distilled) | 135.2, 135.7* | 0 |
| Oil (mineral oil) | 121.1, 122.2* | 0 |

*One measurement each face

As depicted by the Contact Angle measurements for Sample D the Teflon AF coating has transformed the once completely hydrophilic and oleophilic filter screen into a material which is now hydrophobic and oleophobic.

Example 3

Coating Applied to Filter Paper

Part A

A solution of Teflon AF 1600 was prepared as described in Part A of Example 1. A sample disc of hardened Whatman filter paper type #50 (obtained from Whatman, Ltd.) and 150 mm in diameter was placed in a 150 mm petri dish. The solution was applied as in Example 2; and the coated paper was dried as in Example 2.

The dried filter paper was designated Sample E.

Part B

A coating solution was prepared as described in Part B of Example 1 and applied to the same type filter paper as used in Part A of this Example by the same procedure as set forth in said Part A. This sample was designated Sample F. A second batch was labeled Sample G.

The samples were tested and compared with untreated, i.e. uncoated samples with the following results:

|  | Treated Sample | Untreated Sample (Control) |
| --- | --- | --- |
| Sample E | .490% wt/wt solution | |
| Contact Angle (°) | | |
| H$_2$O (distilled) | 139.5, 147.7* | 0 |
| Oil (mineral oil) | 94.2, 95.7* | 0 |

-continued

| | Treated Sample | Untreated Sample (Control) |
|---|---|---|
| Sample F | .493% wt/wt solution | |
| Water Entry Pressure (psi) Non-Gamma irradiated | 0.8 ± 0.05 | 0 psi |
| Sample G | 0.493% wt/wt solution | |
| Water Entry Pressure (psi) Gamma irradiated 5.0 Mrad | 0.9 ± .1 | not performed |

As depicted by the Contact Angle measurements for Sample E, the Teflon AF coating has transformed the hydrophilic and oleophilic filter paper into a material that is now hydrophobic and oleophobic. This is also indicated by the achievement of a measurable WEP in Sample F whereas the control sample had zero WEP.

Sample G, subjected to 5.0 Mrads Gamma radiation, demonstrates how radiation of the Teflon AF coating does not subsequently damage ability to increase WEP. A control sample was not tested since filter paper has zero WEP before radiation treatment.

Example 4

Coating Applied to Nylon Membrane Filter

Part A

A solution of Teflon AF 1600 was prepared as described in Part A of Example 1. Two sample discs of Nylaflo® nylon membrane filter obtained from Gelman Sciences, Inc. were each placed in 150 mm diameter petri dishes. The discs were rated at 0.2 μm (micrometer) pore size with a diameter of 142 mm. The solution was applied to the nylon membrane exactly as in Example 2, and the coated membrane dried as in Example 2; They were designated Samples H.

Part B

A coating solution was prepared as described in Part B of Example 1 and applied to the same type membranes described in Part A of this Example. Three samples were prepared in like manner and designated Samples I, J, and K.

Results

| | Treated Sample | Untreated Sample (Control) |
|---|---|---|
| Sample H | .490% wt/wt solution | |
| Contact Angle (°) | | |
| H₂O (distilled) | 145.5, 135.2* | 0 |
| Oil (mineral oil) | 107.1, 91.1* | 0 |
| Synthetic Perspiration Test Weighted Plate Method | No leak | Leak |
| Sample I | .493% wt/wt solution | |
| Water Entry Pressure (Psi) Non-Gamma irradiated | 49 ± 3 | 0 |
| Sample J | .493% wt/wt solution | |
| Water Entry Pressure (Psi) Gamma irradiated 5.0 Mrad | 24 ± 1 | Not performed |
| Sample K | .493% wt/wt solution | |
| Synthetic Perspiration Test Evaporation Method | No leak | Leak |

*One measurement each face

As depicted by the Contact Angle measurements for Sample H the Teflon AF coating has transformed the once completely hydrophilic and oleophilic nylon membrane into a material which is now hydrophobic and oleophobic. This is further evidenced by the achievement of a WEP in Sample I in which the control sample has zero WEP.

Sample J, subjected to 5.0 Mrads Gamma radiation, demonstrates how radiation does not damage the Teflon AF coating's ability to increase WEP. WEP in Sample J was lower than Sample I, which may be due to the weakening of the radiated nylon. Consequently, Sample J ruptured during WEP testing. The recorded WEP was therefore not the true WEP as defined. A control sample was not pursued since nylon membrane has zero WEP before radiation treatment.

The results of the Synthetic Perspiration Tests for both Samples H and K indicate that the Teflon AF coating renders nylon able to resist water permeation after contact with human perspiration. This indicates that Teflon AF treatment of porous materials can provide a waterproof barrier or fabric whose water protective capabilities would not be compromised after contact with human perspiration.

Example 5

Coating Applied to Porous PTFE/PVC Screen Laminate

Coating procedures were also performed on composite laminates comprised of expanded PTFE and PVC screen. A coating solution was prepared by placing 0.30 grams Teflon AF 1600 in 61.87 grams FC-75 to produce a 0.48% wt./wt. solution. The mixture was immersed in an ultrasonic bath to facilitate solubilization of the Teflon AF. Samples of porous PTFE with 0.45 um reference pore size (obtained from W. L. Gore & Associates, Inc.) were laminated to polyvinyl chloride (PVC). These laminates were cut into 102 mm discs. The discs were placed in a 150 mm diameter petri dish. Since laminated PTFE is held rigid by the PVC backing, there is no need to hold sample in tension. Using a 7.5 ml transfer pipet, the solution was generously applied to the discs in the same manner as set forth in Example 2.

Four such preparations, marked Samples L, M, N, O, were tested and compared with uncoated samples with the following results:

| | Treated Sample | Untreated Sample (Control) |
|---|---|---|
| Sample L | .48% wt/wt solution | |
| Percent weight add-on | 2.45 | Not applicable |
| Gurley Number (seconds) | 6.7 | 6.7 ± .4 |
| Visual Wetting with Power Steering Fluid | | |
| Membrane side | No wet-out after 30 min. | Wet-out within 30 min. |
| Backing side | No wet-out after 30 min. | Wet-out within 30 min. |
| Sample M | .48% wt/wt solution | |
| Percent weight add-on | 2.69 | Not applicable |
| Gurley Number (seconds) | 7.5 | 6.7 ± .4 |
| Visual Wetting with Transmission Fluid (Dexron II) | | |
| Membrane side | No wet-out after 30 min. | Wet-out within 30 min. |
| Backing side | No wet-out after 30 min. | Wet-out within 30 min. |

-continued

| | Treated Sample | Untreated Sample (Control) |
|---|---|---|
| Sample N | .48% wt/wt solution | |
| Percent weight add-on | 2.59 | Not applicable |
| Gurley Number (seconds) | 6.7 | 6.7 ± .4 |
| Visual Wetting with Engine Oil (10w/30) | | |
| Membrane side | No wet-out after 30 min. | Wet-out within 30 min. |
| Backing side | No wet-out after 30 min. | Wet-out within 30 min. |
| Sample O | .48% wt/wt solution | |
| Percent weight add-on | 2.27 | Not applicable |
| Gurley Number (seconds) | 6.6 | 6.7 ± .4 |
| Visual Wetting with Brake Fluid | | |
| Membrane side | No wet-out after 30 min. | Wet-out within 30 min. |
| Backing side | No wet-out 30 min. | Wet-out within 30 min. |

Samples L, M, N and O provide examples of low percent weight gain of Teflon AF coated on each sample. This is further seen by the results of Gurley Number which show that resistance to air flow for all samples is not significantly affected, indicating the pore structure are not being occluded by a coating of Teflon AF. However, even though the coating amount is low, the samples still exhibit considerable oleophobicity versus untreated control samples as determined during the Visual Wetting tests. In all cases the controls became wet-out with various oils with 30 minutes or less while Teflon AF coated samples resisted oil we-out even after 45 minutes.

Example 6

Coating Applied to Nylon Taffeta Fabric

A coating solution of 0.507% wt./wt. was prepared by dissolving 3.56 gm. Teflon AF 1600 in 698.70 gm FC-75. The mixture was immersed in an ultrasonic bath to facilitate solubilization of the Teflon AF. A portion of pure finish nylon taffeta fabric was placed in a 150 mm diameter petri dish. The solution prepared above was generously applied to the nylon taffeta using a 7.5 ml transfer pipet until the entire fabric was covered with a thin layer of solution. The nylon fabric was turned over with tweezers to ensure that the interstitial void spaces of the taffeta were filled with solution.

The nylon fabric was then suspended vertically in a fume hood for 20 minutes to evaporate solvent. The dried treated taffeta fabric (Sample Z) and untreated taffeta fabric from the same source were tested and compared as follows:

The nylon taffeta used was obtained from Duro Finishing of Fall River, Mass. It had a basis weight of 1.7 oz/square yard. It was 106 yarns per inch in the warp direction, 86 yarns per inch in the fill direction, and a yarn denier of 70.

| | Treated Sample | Untreated Sample (Control) |
|---|---|---|
| Sample Z | .507% wt/wt solution | |
| Percent weight add-on | 1.25 | Not applicable |
| Gurley Number (seconds) | .25 ± .01 | .25 ± .02 |
| Visual Oil Wetting Motor Oil (10w/30) | No wet-out after 1 hour | Wet-out instantaneously |
| Transmission Oil (Dexron II) | No wet-out after 1 hour | Wet-out instantaneously |

As depicted by the Visual Oil Wetting test, the once oleophilic Sample A has been rendered oleophobic. However, a light coating has been applied as described by the low Percent Weight Add On. This is further evidenced by the Gurley Number measurements which show that Sample Z has no significant change in its ability to resist air flow.

I claim:

1. A gas permeable material that contains passageways through the material, said material containing on at least a portion of the interior of the passageways an amorphous copolymer of 10–40 mole percent tetrafluoroethylene and complementally 90–60 mole percent of perfluoro-2,2-dimethyl-1,3-dioxole.

2. The gas permeable material of claim 1 wherein the material is a sheet selected from the class consisting of woven fabric, nonwoven fabric, knit fabric, porous polymeric sheets having a microstructure, cellulosic papers, and fiberglass papers.

3. The gas permeable material of claim 2 wherein the material is porous PTFE.

4. The gas permeable material of claim 1 wherein the material is in the form of a plug.

5. The gas permeable material of claim 1 wherein the material is in the form of a tube.

* * * * *